Sept. 28, 1965 H. D. BLAUSTEIN ETAL 3,209,339

SWITCHING CIRCUITS

Filed Oct. 26, 1960 3 Sheets-Sheet 1

INVENTORS
HERBERT D. BLAUSTEIN &
JOHN A. PIERCE
BY John V. Regan
Attorney

INVENTORS
HERBERT D. BLAUSTEIN &
JOHN A. PIERCE
BY John V. Regan
Attorney

INVENTORS
HERBERT D. BLAUSTEIN &
JOHN A. PIERCE
BY John V. Regan
Attorney

United States Patent Office 3,209,339
Patented Sept. 28, 1965

3,209,339
SWITCHING CIRCUITS

Herbert D. Blaustein, Haddonfield, and John A. Pierce, Collingswood, N.J., assignors to Radio Corporation of America, a corporation of Delaware Filed Oct. 26, 1960, Ser. No. 65,169
6 Claims. (Cl. 340—174.1)

This invention relates to switching circuits and a method of operating same, and more particularly to switching circuits for coupling signals to and from a plurality of transducers. The invention is useful, for example, in the reading and writing of signals indicative of binary digits on a magnetic recording medium such as a drum.

In certain applications, such as data processing, the coupled signals may be information signals. Often it is desirable to write at one location of a recording medium while simultaneously reading from a second medium location. This simultaneous operation can bring about an appreciable saving in time particularly with large switching networks. Prior switching circuits could not readily perform this simultaneous operation because of undue noise feed-through and signal attenuation. The noise signal could not easily be kept at a minimum while at the same time maintaining the desired signals at a maximum.

It is therefore an object of this invention to provide improved switching circuits and improved method of operating the same.

It is another object of this invention to provide improved switching circuits in which it is possible to select different transducers for simultaneous reading and writing operations.

It is still a further object of this invention to provide an improved switching circuit which the noise feed-through and signal attenuation are reduced or kept to a minimum.

It is also an object of this invention to provide an improved switching circuit which is simple and economical to manufacture and which can be easily expanded in size.

A preferred form of switching circuit according to the invention includes first and second switch elements, each having high and low impedance conditions. The switch elements and a transducing means are connected at a common terminal. During a writing operation one of the switch elements is placed in its low impedance condition and the other in its high impedance conditions. Write signals are then passed by the one switch element which is in a low impedance condition to the transducing means; the other switch element which is in a high impedance condition substantially blocks all the write signal. During a reading operation, the impedance condition of the switch elements are reversed so that the other switch element is biased to its high impedance condition and the one switch element to its low impedance condition. Reading signals generated by the transducing means are then passed by the other switch element.

According to one feature of the invention, a pair of first elements and a pair of second elements are connected with the transducing means across a pair of common terminals for coupling signals of either polarity.

According to another feature of the invention a plurality of switch elements and transducing means are arranged with a common write select means and a common read select means. Operation of the write and read select means permits coupling of writing signals into one transducing means while simultaneously coupling reading signals from another transducing means. A common read amplifier circuit may be used for all the transducing means.

The invention also provides a novel method of operating a switching network to minimize feed-through signals occurring during the simultaneous read-write operation. The method includes using spaced write pulses and performing the read operation between the spaced write pulses.

The novel features of this invention, both as to its organization and method of operation, will be best understood from the following description when read in connection with the accompanying drawings in which like reference numerals refer to like parts, and in which.

Figure 1:
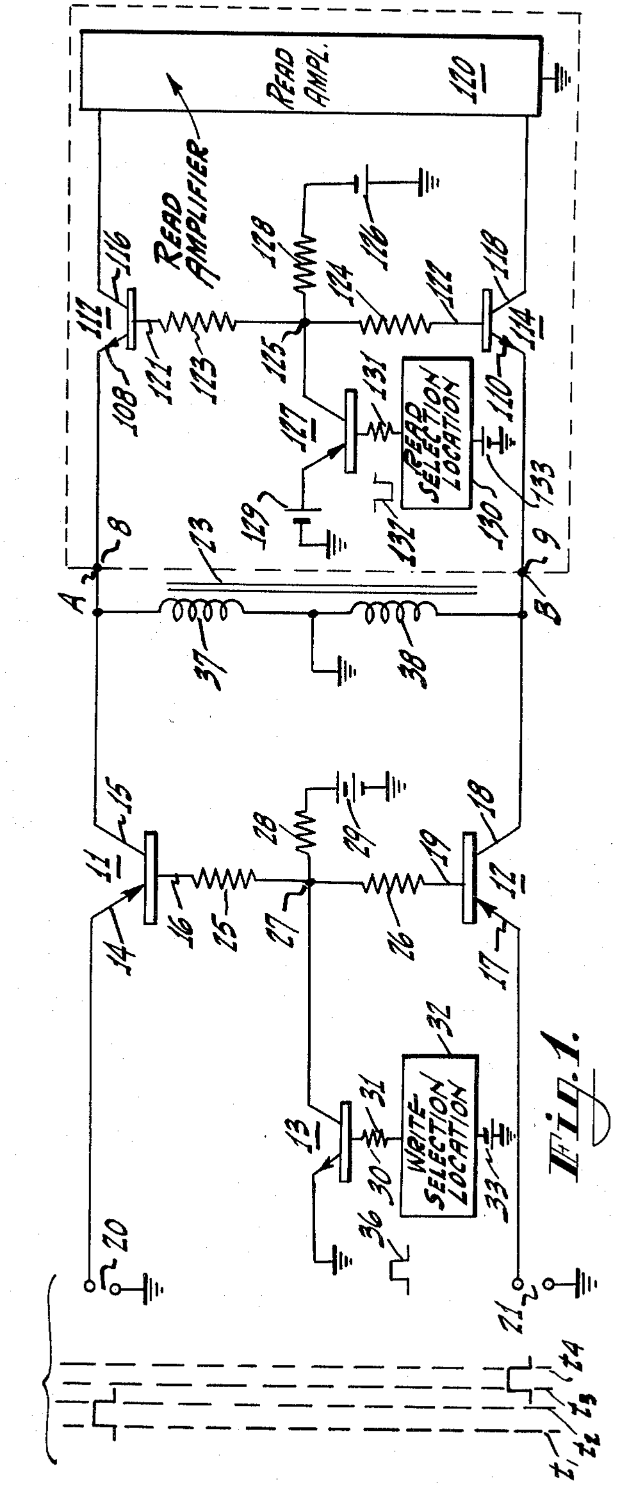
FIGURE 1 is a circuit diagram of a switching circuit according to the invention using transistor switch elements.

An embodiment of the invention for coupling a pair of signals to and from a transducing means is shown in FIGURE 1. The upper and lower portions of the circuit are symmetrical, with the upper portion being used for one signal, say positive, and the lower half for a similar signal. The transducing means includes an upper coil 37 and a lower coil 38 each having one end connected to a common reference point, shown as ground. The other ends of the coils 37 and 38 are connected to the common points 8 and 9, respectively. If desired, a single center-tapped coil may be used for the pair of coils 37 and 38.

The transducing means may be coupled to any suitable device for receiving and transmitting signals from and to the coils 37 and 38. In the exemplary embodiment, the transducing means coils are magnetically coupled to a recording medium indicated by the vertical lines 23.

The portion of the circuit to the left of the coils 37 and 38 is a write gate used for conveying writing signals and includes an upper switch element shown as a transistor 11 and a lower switch element shown as a transistor 12. The transistors may be PNP type as shown, or, if desired, NPN transistors can be used with suitable biasing potentials. The collector electrodes 15 and 18 are coupled respectively to the common points 8 and 9. The emitter electrodes 14 and 17 are coupled respectively to first and second pairs of input terminals 20 and 21. One terminal of each input pair is connected to ground.

The base electrodes 16 and 19 of the transistors 11 and 12 are resistor coupled via resistors 25 and 26 to a junction point 27. The point 27 is normally maintained at a relatively positive potential by a resistor 28 and a battery 29. The negative terminal of the battery 29 is connected to ground.

A write selecting means for the write transistors 11 and 12 is provided by transistor 13. The collector electrode of the transistor 13 is connected to the junction point 27 and the base electrode of the transistor 13 is normally biased to a negative potential sufficient to cut the transistor off by any suitable means such as a bias battery 33. The positive terminal of the battery is connected to ground. Transistor 13 may be rendered conductive by a positive voltage, shown as a pulse 36, applied from write selection source 32 via a resistor 31 to the base of the transistor.

The portion of the circuit to the right of the coils 37 and 38 is a read gate used for reading signals from the medium 23. The read portion includes first and second switch elements, shown as transistors 112 and 114 of the NPN type. (PNP transistors with suitable biasing potentials can be used instead.)

The emitter electrodes, 108 and 110 of the NPN transistors are connected to the common terminals 8 and 9, respectively. The collector electrodes 116 and 118 are connected to a pair of inputs of a read amplifier 120 which may be any suitable amplifier, for example. a differential amplifier. The base electrodes 121 and 122 of the NPN transistors 112 and 114 are resistor coupled via resistors 123 and 124 to a junction point 125.

The point 125 between resistors 123 and 124 is normally maintained at a potential which is sufficiently negative to maintain transistors 112 and 114 cut-off by a suitable biasing means such as battery 126. Resistor 128 couples the battery to point 125. The positive terminal of the battery is connected to ground.

The read selection means includes a PNP transistor 127 the collector of which is connected to point 125. The base electrode of transistor 127 is normally maintained at a potential which is sufficiently positive to maintain the transistor cut-off by any suitable means such as battery 133. The negative terminal of the battery is connected to ground. Transistor 127 may be rendered conductive by a negative voltage, shown as a pulse 132, applied from selection source 130 through resistor 131 to the base electrode of the transistor.

In operation, all of the circuit transistors are normally biased in the non-conducting condition. The PNP write transistors 11 and 12 are maintained non-conducting via the positive potential applied to their base electrodes, by battery 29; and the NPN read transistors 112 and 114 are maintained non-conducting by the negative potential applied to their base electrodes by battery 126. If desired, the battery potentials may be supplied from a common source.

Assume now that it is desired to apply a positive polarity write pulse to record a signal on the medium 23. In such case, the write selection source 32 is operated to apply a positive potential to the base electrode 30 of the write select transistor 13. This potential changes the select transistor 13 from its non-conducting to its full conducting condition. The junction point 27 is changed from a relatively positive to a relatively negative potential thereby conditioning both writing transistors 11 and 12 to conduct. In this condition, transistors 11 and 12 present a low impedance, of the order of an ohm or so, in their emitter-collector paths.

During the interval the transistor such as 11 is conditioned to conduct, a positive write pulse $t_1$–$t_2$ may be applied from any suitable source to input terminals 20. This pulse passes through the transistor 11, with substantially no attenuation, to the upper transducing coil 37. The flux change produced in the coil 37 causes a signal to be applied to the transducing means 23. If the positive pulse were applied to input terminal 21 instead of input terminal 20, the signal would be passed by transistor 12 in the same manner.

Coil 38 may be wound in the same sense as coil 37. In this case, the flux change in coil 38 is in an opposite sense from the flux change in coil 37 and the two coils write signals of opposite polarity in medium 23. Signals of opposite polarity may be simultaneously written by simultaneously applying positive pulses to terminals 20 and 21 during the time transistors 11 and 12 are conditioned to conduct.

If it is desirable to record on the medium 23 information representing a binary "0" or a binary "1," a second method may also be used. The transistors 11 and 12 are changed to their conducting condition as hereinafter explained. At a later time $t_1$, a positive write pulse is applied to one of the pairs of input terminals, say 20. It is passed by the transistor 11 to the upper transducing coil 37. The flux change produced in the coil 37 applies a signal of one polarity to the transducing means 23. At time $t_2$ the positive write pulse is terminated. At a later time $t_3$ a second positive pulse is applied to input terminal 21 and is passed to coil 38 by transistor 12. The coil 38 may be either oppositely wound or wound in the same direction as coil 37, depending on whether it is desirable to record two pulses of the same polarity separated by a period of time or whether it is desirable to record a pulse of one polarity followed by a pulse of a second polarity, after a certain period of time.

Figure 3:
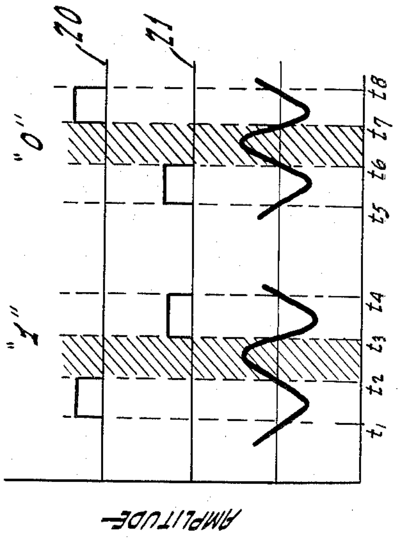
FIGURE 3 is a graph of waveforms useful in explaining the operation of the circuit of FIG. 1.

As shown in FIG. 3, a positive pulse applied to input 20 followed by a positive pulse applied to input 21 can be made to represent a binary digit "one" and the reverse a binary digit "zero." Whichever method is used for recording on the medium 23, during the write operation the read transducers 112 and 114 are both biased in a non-conducting condition. Hence, the impedance in their collector-emitter paths are relatively high, in the order of a megohm, or more. Therefore, very little of the input signals applied to the input terminals 20 and 21 are passed by the read transistors 112 and 114.

Assume now it is desired to receive read pulses from the medium 23. In this case the read selection source 130 is operated to apply a negative potential to the base electrode of the read select transistor 127. This potential changes the transistor 127 from its nonconducting to its full conducting condition. The junction point 125 is changed from a relatively negative to a relatively positive potential by means of battery 129 thereby conditioning both transistors 112 and 114 to conduct. In this condition, transistor 112 and 114 present a low impedance in their emitter-collector paths. During the reading operation, the write transistors 11 and 12 are both biased in a non-conducting condition. Hence the impedance in their collector-emitter paths is relatively high, in the order of a megohm or more. Thus very little of the output signals is lost to the write transistors 11 and 12.

Figure 4:
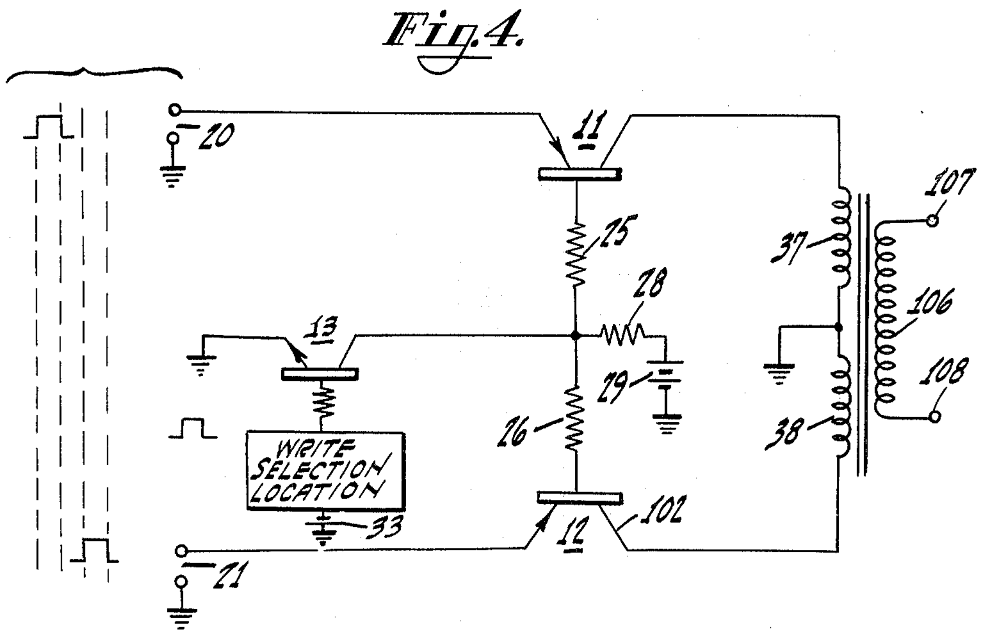
FIGURE 4 is a circuit diagram of a switching circuit according to another embodiment of the invention.
Figure 5:
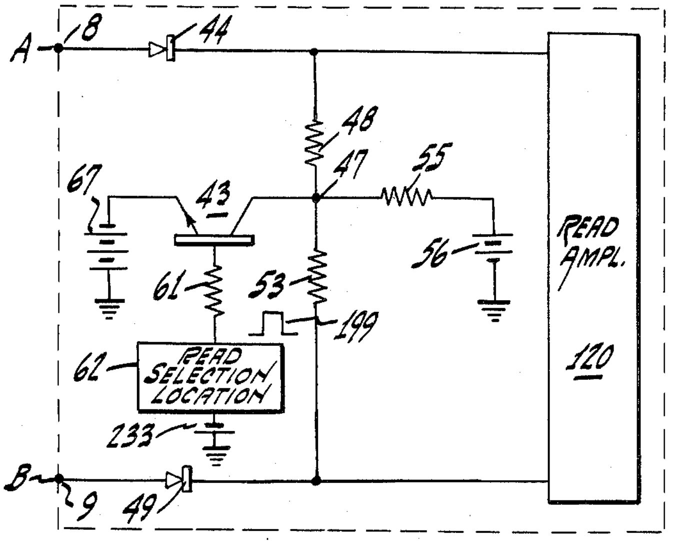
FIGURE 5 is a schematic diagram of a portion of a switching network according to the invention using diodes.

Two other embodiments of this invention for coupling a pair of signals from a transducing means to a utilization device are shown in FIGS. 4 and 5. The circuit of FIG. 4 is the same as that of FIG. 1 except for the magnetic field producing windings. In the circuit of FIG. 4 these include a secondary 106 with output terminals 107 and 108. The operation of both circuits is the same.

FIG. 5 illustrates a circuit which can be substituted for the read portion of the circuit enclosed within the dashed box of FIG. 1. The circuit consists of a pair of unilateral conducting diodes 44 and 49 which are connected to the common terminals 8 and 9, respectively, by their anodes. The cathodes of the diodes 44 and 49 are connected to a pair of inputs of a read amplifier 120 which may be, as heretofore explained, a differential amplifier. The cathodes are also coupled via resistors 48 and 53 to a junction point 47. The point 47 is normally maintained at a positive potential by a battery 56. The battery is connected to point 47 through resistor 55. The negative terminal of the battery is grounded.

The read selection circuit includes an NPN transistor 43 the collector electrode of which is connected to junction 47. The base electrode of transistor 43 is normally held at a potential which is sufficiently negative to maintain transistor 43 cut off as, for example, by a battery 233 the positive terminal of which is connected to ground. Read selection signals 199 are applied to the base electrode of transistor 43 from read selection source 62 through a resistor 61.

In operation, a positive pulse is applied to the read selection location 62 thereby switching the select transistor 43 from a non-conducting to a conducting condition. This causes the junction point 47 to change from a positive to a negative potential by battery 67 thereby causing both diodes 44 and 49 to be forward biased. If read pulses are received by the coils 37 and 38 from the medium 23, during the time the diodes are forward biased, the pulses will be transmitted to the read amplifier.

Figure 2:
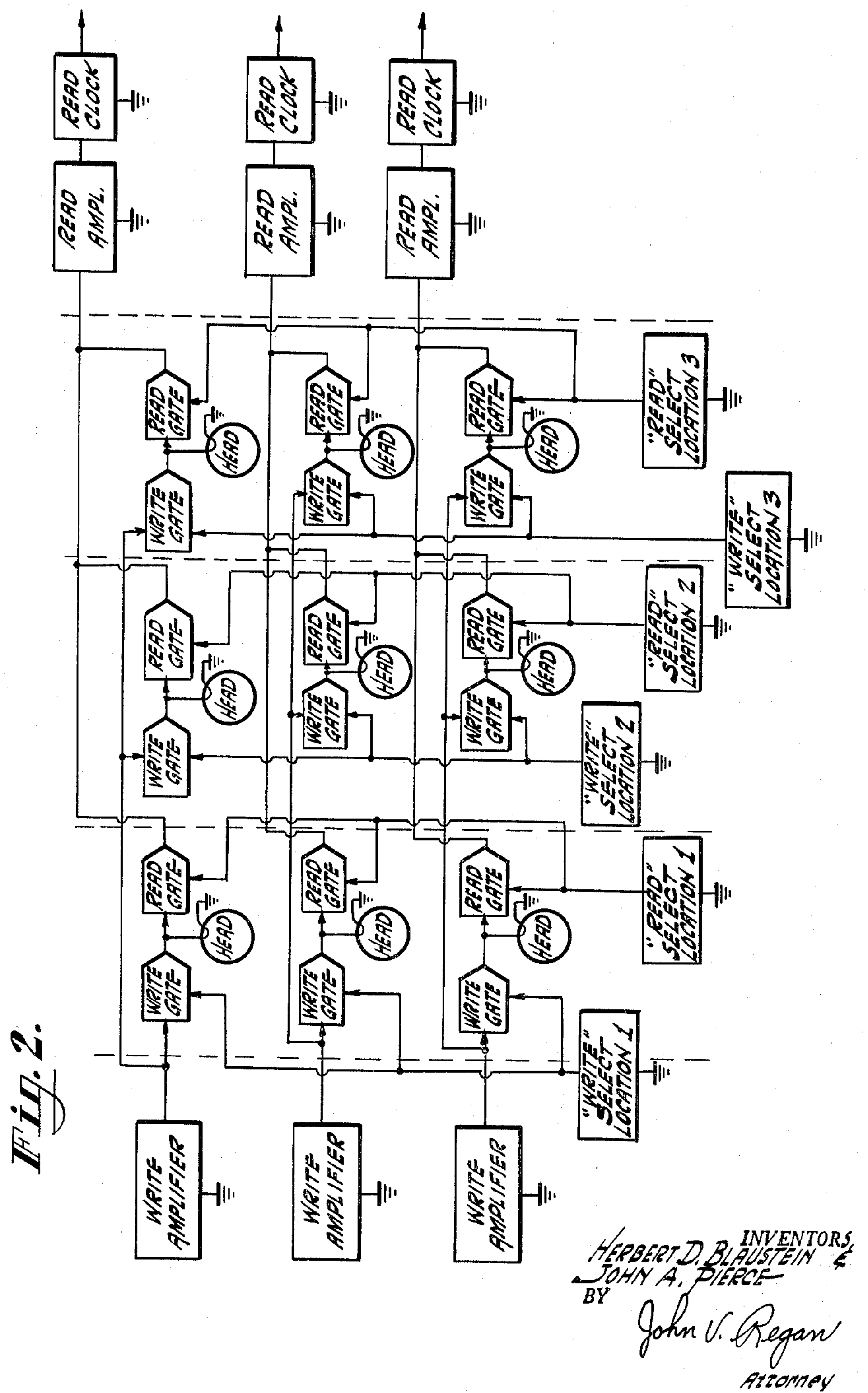
FIGURE 2 is a matrix of switching circuits and associated transducers.

FIG. 2 of the drawing shows a plurality of switch elements and transducing means arranged with a common write select means and a common read select means. Operation of the write and read select means permits coupling of writing signals into one group of transducing means while simultaneously coupling reading signals from another group of transducing means. Take, for example, a situation where it is desirable to write on one or more of the mediums adjacent to the transducers in column 1 whiler eading from one or more of the mediums adjacent to the transducers in column 3. By applying a pulse to write selection location 1, all the write gates associated therewith will be changed from a high impedance (non-conducting condition) to a low impedance (conducting condition) as heretofore explained. At the same time, the read gates can be made to present a high impedance. Therefore, when signals from a source such as a write amplifier are applied to the write gates, they will be transmitted to the transducers which will, in turn, apply the signals to the medium. Since the read gates are at a high impedance, the signals applied to the head will not be transmitted to the read amplifier.

At the same time as when the signals are being applied to the recording heads in column 1, a pulse may be applied to, say, read select location 3, thereby changing all the read gates in column 3 from a high to a low impedance condition. Therefore, any signals received by the transducers in column 3 from their adjacent mediums will be conveyed through the read gates to the read amplifiers or other utilization devices.

In order to prevent the signals received by the transducers in column 3 from passing through the write gates associated therewith, the write gates are maintained at a high impedance when signals are being transmitted through the read gates. In order to prevent noise feed through and signal attenuation when reading by one group of heads while writing by a second group of heads simultaneously to read out signals, as shown in FIG. 3, are delayed a short period of time so that the maximum amplitude of the read signal is transmitted through the read gates midway between the input pulses being applied to the write gates.

We claim:

1. A memory system comprising a plurality of transducers, an equal plurality of write gates each including write input terminals and including output terminals connected to a corresponding transducer, an equal plurality of read gates each including input terminals connected to a corresponding transducer and including read output terminals, a write amplifier coupled to all of said write input terminals, a read amplifier coupled to all of said read output terminals, means to render conductive the write gate connected to one of said transducers to permit the passage of write signals to the transducer, and means operative at the same time to render conductive the read gate connected to another one of said transducers to permit the passage of read signals from the transducer to said read amplifier.

2. A magnetic memory system comprising a plurality of magnetic heads, each of said heads including a coil, an equal plurality of write gates each including write input terminals and including output terminals connected to a corresponding coil, an equal plurality of read gates each including input terminals connected to a corresponding coil and including read output terminals, a write amplifier coupled to all of said write input terminals, a read amplifier coupled to all of said read output terminals, means to render conductive the write gate connected to one of said coils, and means concurrently to render conductive the read gate connected to another one of said coils, whereby writing can be performed by one head simultaneously with the performance of reading from another head.

3. A magnetic memory system comprising a plurality of magnetic heads, each of said heads including a coil having terminal ends, an equal plurality of transistor write gates each including write input terminals and including output terminals connected to the ends of a corresponding coil, an equal plurality of transistor read gates each including input terminals connected to the ends of a corresponding coil and including read output terminals, a write amplifier coupled to all of said write input terminals, a read amplifier coupled to all of said read output terminals, means to render conductive the write gate connected to one of said coils to permit the passage of write signals to the coil, and means operative concurrently to render conductive the read gate connected to another one of said coils to permit the passage of read signals from the coil to said read amplifier, whereby writing can be performed by one head simultaneously with the performance of reading from another head.

4. A magnetic memory system comprising a plurality of magnetic heads, each of said heads including a coil having terminal ends, an equal plurality of write gates each including first and second write input terminals and including output terminals connected to the ends of a corresponding coil, an equal plurality of read gates each including input terminals connected to the ends of a corresponding coil and including read output terminals, a write amplifier coupled to all of said write input terminals, said write amplifier being constructed to supply pulses to said first and second write input terminals in one time sequence to represent one binary bit and in the opposite time sequence to represent the other binary bit, a read amplifier coupled to all of said read output terminals, means to render conductive the write gate connected to one of said coils to permit the passage of write signals to the coil, and means operative at the same time to render conductive the read gate connected to another one of said coils to permit the passage of read signals from the coil to said read amplifier.

5. A magnetic memory system comprising a plurality of magnetic heads, each of said heads including a coil having terminal ends, an equal plurality of write gates each including write input terminals and including output terminals connected to the ends of a corresponding coil, an equal plurality of read gates each including input terminals connected to the ends of a corresponding coil and including read output terminals, each of said write and read gates comprising a first transistor in circuit with one input electrode and one output electrode, a second transistor in circuit with the other input electrode and the other output electrode, and a third transistor coupled to said first and second transistors to control their conductivity, a write amplifier coupled to all of said write input terminals, a read amplifier coupled to all of said read output terminals, means to render conductive the write gate connected to one of said coils to permit the passage of write signals to the coil, and means operative at the same time to render conductive the read gate connected to another one of said coils to permit the passage of read signals from the coil to said read amplifier.

6. A magnetic memory system comprising a plurality of magnetic heads, each of said heads including a coil having terminal ends, an equal plurality of write gates each including write input terminals and including output terminals connected to the ends of a corresponding coil, an equal plurality of read gates each including input terminals connected to the ends of a corresponding coil and including read output terminals, said heads and corresponding gates being arranged in a number of groups, an equal number of write amplifiers each coupled to all of the write input terminals of a corresponding group, an equal number of read amplifiers each coupled to all of the read output terminals of a corresponding groups, means to render conductive one write gate in each of said groups to permit the passage of write signals from corresponding write amplifiers to corresponding coils, and means operative at the same time to render conductive one read gate in each of said groups to permit the passage of read signals from corresponding coils to corresponding read amplifiers, whereby writing can be performed by one head in each group simultaneously with the performance of reading by one other head in each group.

References Cited by the Examiner

UNITED STATES PATENTS

| | | | |
|---|---|---|---|
| 2,825,889 | 3/58 | Henle | 340—166 |
| 2,963,685 | 12/60 | Lauer et al. | 340—166 |
| 2,994,067 | 7/61 | Rajchman | 340—174 |
| 3,002,184 | 9/61 | Proebster | 340—174 |
| 3,019,420 | 1/63 | Reinholtz | 340—174.1 |
| 3,115,621 | 12/63 | Slavin | 340—174.1 |
| 3,122,726 | 2/64 | King et al. | 340—174.1 |
| 3,133,273 | 5/64 | Hopkins | 340—174.1 |

IRVING L. SRAGOW, *Primary Examiner.*

STEPHEN W. CAPELLI, *Examiner.*